United States Patent
Cookson

(10) Patent No.: US 8,140,284 B2
(45) Date of Patent: Mar. 20, 2012

(54) SYSTEM FOR MAPPING VEHICLE MUTILATION DEFECTS

(75) Inventor: Adam Roy Cookson, San Antonio, TX (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 441 days.

(21) Appl. No.: 12/409,121

(22) Filed: Mar. 23, 2009

(65) Prior Publication Data

US 2010/0241380 A1    Sep. 23, 2010

(51) Int. Cl.
- G01N 37/00 (2006.01)
- C23C 16/52 (2006.01)
- G06K 9/00 (2006.01)

(52) U.S. Cl. .................. 702/84; 427/8; 382/141

(58) Field of Classification Search .......... 702/84, 702/34–36, 81, 182, 184–186, 188; 345/426, 345/428, 440–442, 467, 589, 617, 619, 629–630, 345/632–634, 636, 689; 382/108, 141, 143, 382/149, 152; 700/9, 17, 95, 108–110; 705/7.38–7.39, 7.41
See application file for complete search history.

(56) References Cited

U.S. PATENT DOCUMENTS

| | | | |
|---|---|---|---|
| 4,807,991 A | 2/1989 | Carew | |
| 6,917,860 B1 | 7/2005 | Robinson et al. | |
| 7,437,249 B2 | 10/2008 | Corson et al. | |
| 2005/0186327 A1* | 8/2005 | Saito et al. | 427/8 |
| 2007/0257620 A1 | 11/2007 | Gorrell et al. | |

* cited by examiner

Primary Examiner — Michael Nghiem
Assistant Examiner — Toan M Le
(74) Attorney, Agent, or Firm — Gifford, Krass, Sprinkle, Anderson & Citkowski, P.C.

(57) ABSTRACT

A system and method for analyzing mutilation defects including a benchmark image of a part and a grid having a plurality of cells plotted onto the benchmark image is provided. The system further includes a computer processing unit having an interface operable to associate each identified mutilation defects with the associated cell where the mutilation defect occurred. The system and method further includes a plotting circuit having a code. Each of the labels is associated with a predetermined occurrence of mutilation defects within a given cell. The plotting circuit counts each occurrence of a mutilation defect within each of the cells and plots the associated label within the cell so as to improve the quality control of a part by providing a map showing the frequency of mutilation defects on a particular part of a mass produced product.

7 Claims, 4 Drawing Sheets

SYSTEM FOR MAPPING VEHICLE MUTILATION DEFECTS

FIELD OF THE INVENTION

The present invention relates to a system and method for analyzing mutilation defects so as to improve quality control of a production line. In particular, the present invention relates to a method and system for mapping mutilation defects using a code.

DESCRIPTION OF MATERIAL ART

Manufacturing plants include production lines for the production of a product such as a vehicle. The production lines are configured to perform tasks in a sequential manner so as to mass produce the vehicle. In many cases, the manufacturing plant mass produces the vehicle for commercial use. This requires delivering the vehicle to different workstations where tasks may be performed. Each workstation is configured to perform a specific task. The product is often inspected throughout the process as well as at the end of the process to ensure that defects are not present.

Defects may be categorized into two different types of defects: functional defects and mutilation defects. Functional defects relate to defects in a functioning element of the vehicle, such as an inoperable tail light or windshield wiper. Mutilation defects relate to damage done to the appearance of the vehicle, such as a chip or scratch in the paint, or a dent on the vehicle surface.

With regards to functional defects, it is often relatively easy to determine the cause of the functional defect. For example, in a case where the headlight is not operating the cause may be determined by trouble shooting the part. The headlight may be taken apart to see if the headlight was wired properly or to see if the bulb is defective. However, mutilation defects may occur as the result of an errant event, such as someone accidently scraping the paint. Other vehicle mutilation defects may result from a process abnormality. A process abnormality may occur by the way in which a task is routinely performed or the tool itself may perform incorrectly. In the first instance, the process abnormality may occur because a tool is placed too close to the vehicle body, which in turn causes the workstation operator to routinely bump the tool against the vehicle body so as to cause damage to the vehicle paint or surface. In the second instance, the tool may be defective, thus the tool may cause a mutilation defect absent operator error. Accordingly, vehicle mutilation defects such as scratches, dents, chips and the like, it is often hard to determine the root cause because such a defect may be caused by a number of different factors.

It is known to make a history of the vehicle mutilation defects so as to identify an area of the vehicle which is subjected to the same type of vehicle mutilation defect. This enables a person such as a plant manager to identify a possible root cause and to take preventive measures so as to prevent the vehicle mutilation defect from occurring. For instance if a paint chip frequently occurs at the exact same location, then the paint chip is probably a result of either the manner in which a process is being performed or a tool malfunction. Accordingly the plant manager can then examine the process or tool to determine what measures to take to prevent the same occurrence in the future.

With reference now to FIG. 1 the prior art system for recording vehicle mutilation defects is provided. The system plots the mutilation defect found on a particular part of a manufactured vehicle over a predetermined period of time. As shown the system includes a plurality of points which associate a vehicle mutilation defect with a particular part of the vehicle body. In the prior art figure, mutilation defects are plotted over the course of one thousand vehicles being produced. The frequency in which the mutilation defects occur in a particular area of the vehicle is obscured as the particular part is plotted with numerous points.

Accordingly, it is desirable to have a mapping system which enables the user to determine the frequency of a vehicle mutilation defect which occurs on a particular part of a vehicle body. In particular it is desirable to have a system using a code having various labels such as colors to identify the particular frequency of vehicle mutilation defects at a particular location of the vehicle body.

Such mapping systems using color codes are currently known and used in other fields such as weather topography maps and climate maps for specific geographic regions. The colors are used to provide a history of an occurrence in a particular area, such as the amount of rainfall received in a particular location over a predetermined period. However the field of environmental studies and geography is not necessarily concerned with identifying the root cause of the occurrence, meaning the study is done to provide information to people as to the general nature and climate of a particular region so that the user can plan trips and events. Accordingly, it remains desirable to have a mapping system for identifying the frequency of a mutilation defect on a production part so as to isolate potential system or performance failures which may be responsible for the frequency of mutilation defects.

SUMMARY OF THE INVENTION AND ADVANTAGES

A system for mapping mutilation defects is provided. The system includes a benchmark image of a part. A grid system having a predetermined number of cells is plotted onto the benchmark image. The system also includes a computer processing unit having an interface for entering mutilation defects. The interface is operable to associate the location of the detected mutilation defect to the corresponding cell plotted on the benchmark image. The computer processing unit stores the mutilation defects in a first database.

The system further includes a plotting circuit. The plotting circuit has a code. The plotting circuit counts each occurrence of mutilation defects in each of the cells so as to provide a total count of mutilation defects in each of the cells. The code includes a predetermined number of different labels wherein each of the predetermined number of labels is associated with a predetermined range of the total count of mutilation defects. For instance one of the labels may be associated with the count of 0 to 10 defects. Another of the labels may be associated with a count between 11 to 20 mutilation defects, and yet another of the labels may be associated with a count greater than 30 mutilation defects. The plotting circuit plots each of the cells with a label corresponding to the total count of mutilation defects tallied in the cell. The system also includes a display for displaying the plotted labels on the benchmark image of the vehicle. The labels quickly and easily identify the frequency of defects which have occurred in a particular part of the vehicle body over a predetermined period of time.

DETAILED DESCRIPTION OF A PREFERRED EMBODIMENT OF THE PRESENT INVENTION

Figure 1:
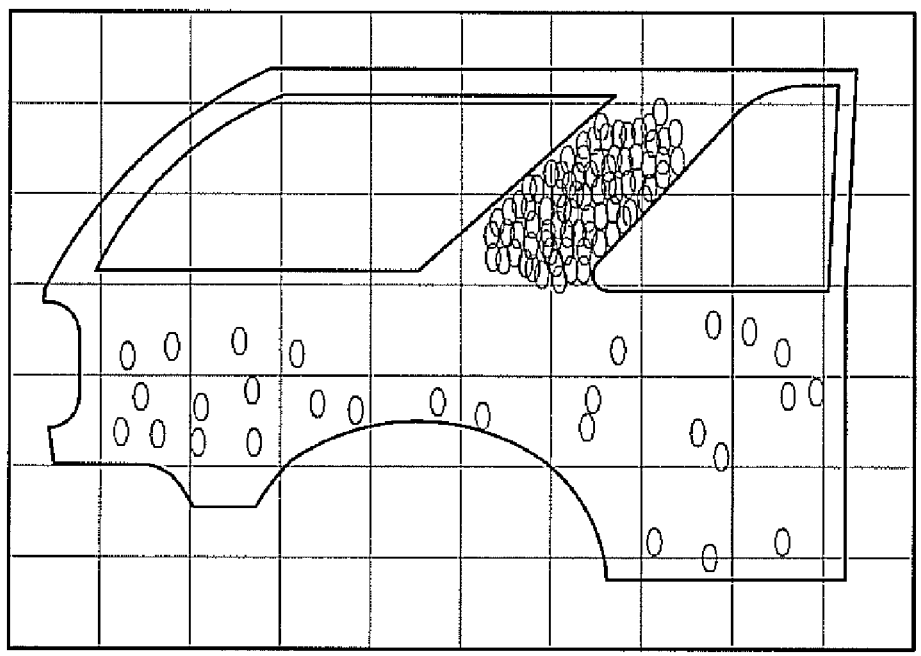
FIG. 1 is a view of a prior art quality control system.
Figure 2:
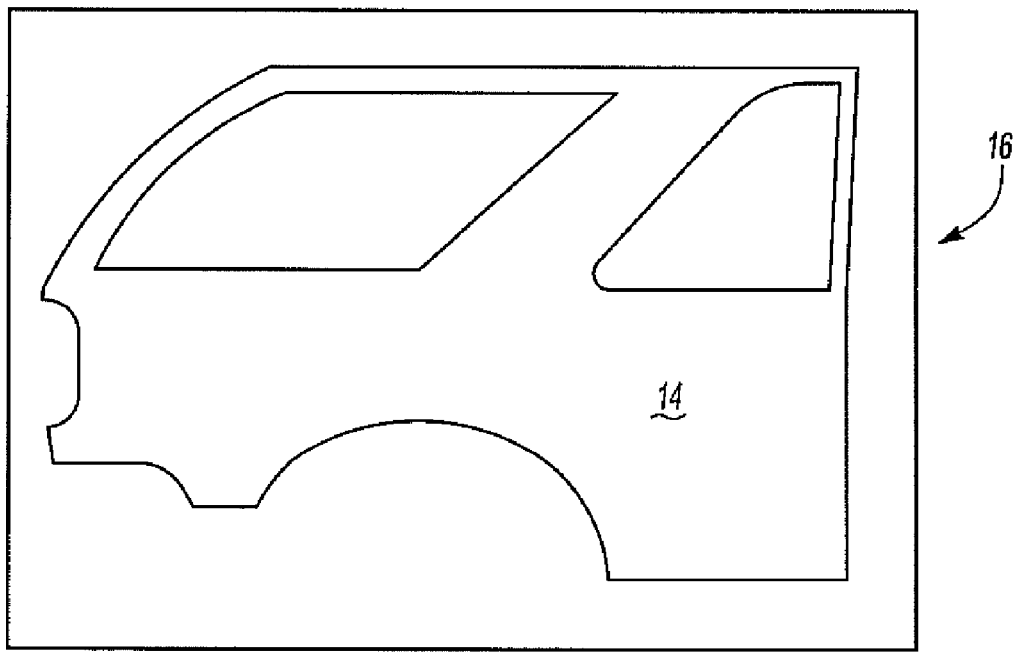
FIG. 2 is a view of a benchmark image.

A system 10 for analyzing mutilation defects so as to improve quality control of a production line 12 is provided. For illustrative purposes, the system 10 is used to improve the quality control of a production line 12 configured to mass assemble a vehicle 14. The system 10 includes a benchmark image 16 of a vehicle 14 or vehicle part, as shown in FIG. 2. A grid system 18 having a predetermined number of cells 20 is plotted onto the benchmark image 16. The system 10 also includes a computer processing unit 22 having an interface 24 for entering mutilation defects. The interface 24 is operable to associate the location of the detected mutilation defect to the corresponding cell 20 plotted on the benchmark image 16. For instance, with reference to FIG. 3, the benchmark image 16 of a vehicle 14 is provided with a grid system 18 plotted thereon.

Alternatively, the interface 24 may be a remote touch screen device 24 used to indicate where on the benchmark image 16 of the vehicle 14 the mutilation defect is found. The remote touch screen device 24 may display 26 the benchmark image 16 and the user may plot mutilation defects onto the touch screen device 24. The touch screen device 24 may be in direct communication with the computer processing unit 22 or may be uploaded onto the computer processing unit 22. The computer processing unit 22 then associates the location of the mutilation defect on the benchmark image 16 with the cell 20 corresponding to where the mutilation defect was found. A database 28 is also provided. The database 28 is in communication with the computer processing unit 22 and stores the mutilation defects inputted by the interface 24.

The system 10 further includes a plotting circuit 30. The plotting circuit 30 has a code. The plotting circuit 30 counts each occurrence of mutilation defects in each of the cells 20 so as to provide a total count of mutilation defects in each of the cells 20. The code includes a predetermined number of labels 34. Each of the labels 34 is different from the other, and each of the predetermined number of labels 34 is associated with a predetermined range of total count of mutilation defects. For instance label 1 may be associated with the count of 0 to 10 defects. Label 2 may be associated with a count between 11 to 20 mutilation defects, and label 3 may be associated with a count greater than 20. The number of labels 34 may be indefinite and it is inherent that the labels 34 may be associated with a count value other than the ones previously described. The plotting circuit 30 plots each of the cells 20 with a label 34 corresponding to the total count of mutilation defects tallied in the cell 20.

Figure 4:
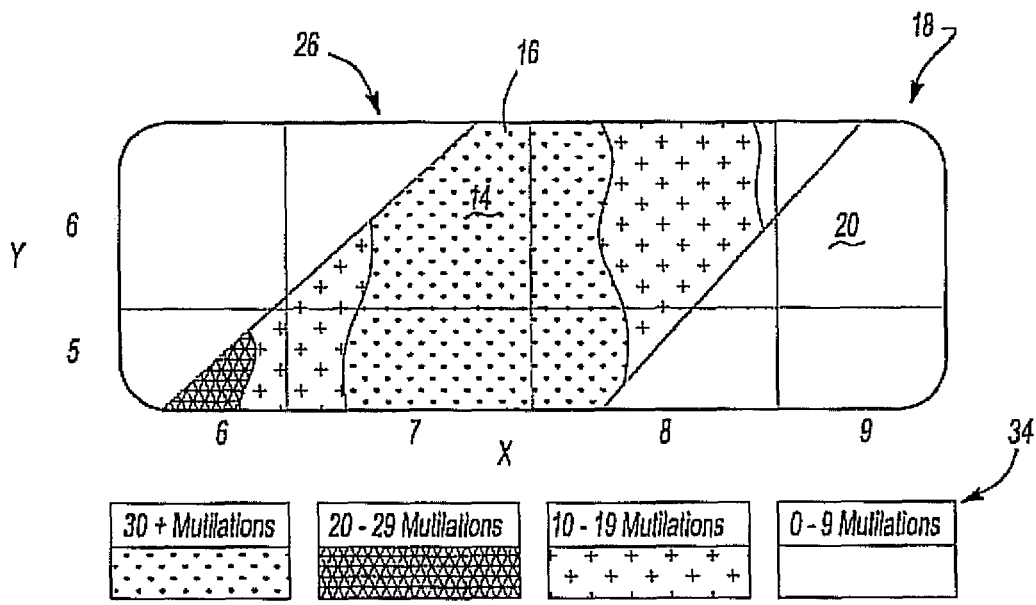
FIG. 4 is a view of the benchmark image plotted with the code showing the frequency of mutilation defects found over a predetermined period of time.

The system 10 also includes a display 26 for displaying the plotted labels 34 on the benchmark image 16 of the vehicle 14. With reference now to FIG. 4 the each label 34 is indicated by a shading. The range of total count value associated with each label 34 is provided in the accompanying legend. The labels 34 quickly and easily identify the frequency of defects which have occurred in a particular part of the vehicle 14 body over a predetermined period of time. Thus, it is anticipated that the labels 34 may be different colors or symbols as well.

The computer processing unit 22 may also include a first list 36. The first list 36 presents a list of predetermined types of mutilation defects. The interface 24 is operable to selectively choose from one of the predetermined types of mutilation defects that is associated with the mutilation defect found on the vehicle 14. The type and location of the mutilation defect are stored in the first database 28.

The system 10 may also include a root cause analysis circuit 38. The root cause analysis circuit 38 has a second list 40. The second list 40 includes a plurality of predetermined root causes. Each one of the plurality of predetermined root causes of the second list 40 is associated with at least one of the types of mutilation defects as well as the area of the vehicle 14 body in which the mutilation defect was found. The root cause analysis circuit 38 then analyzes the type and location of mutilation defects stored in the database 28 so as to provide one of the associated root causes found in the list.

It is inherent that there may be some instances where the root cause of the mutilation defect is unknown. Thus the root cause analysis circuit 38 may have a threshold value. The threshold value is a predetermined count of mutilation defects in any given area of the vehicle 14 over a predetermined time. The root cause analysis circuit 38 processes the database 28 and identifies which of the cells 20 does not contain a count value greater than the threshold value. The root cause analysis circuit 38 then identifies those cells 20 having a count value less than the threshold value as being instances of mutilation defects wherein the root cause is unknown.

For illustrative purposes, assume the threshold value is a count of ten mutilation defects or less, and the benchmark image 16 is storing mutilation defects over a one year period. If there are two occurrences of a scratch in a cell 20 associated with the right-hand fender of the vehicle 14, then the root cause analysis circuit 38 will associate those mutilation defects as being from an unknown root. However, if there are ten or more then the root cause analysis circuit 38 will select a possible root cause based upon factors such as the location of the mutilation defect and the type of mutilation defect found. For instance, if a scratch occurs in a location of the vehicle 14 corresponding to the height of the waist of a person more than ten times over a vehicle 14 sample, then the root cause analysis circuit 38 may associate the scratch with a belt buckle caused by a worker coming too close to the vehicle 14 body.

Conversely, the root cause analysis circuit 38 may use the threshold value of mutilation defects to filter the database 28 for mutilation defects in which the cause is unknown or errant. For example, if there is only one scratch in a particular cell 20 over one thousand vehicles 14 the root cause analysis may associate the scratch as being errant or unknown. If the scratch occurs in a location of the vehicle 14 that is not accessed by a person, then the root cause of the scratch may be unknown. In another example, a particular area of a vehicle 14 subject to various types of mutilation defects such as scratches, dents, and chips may also produce an unknown root cause. Accordingly, the root cause may be programmable to include various factors which may be considered to provide a root cause for the frequency of a particular mutilation found in a particular cell 20.

Figure 5:
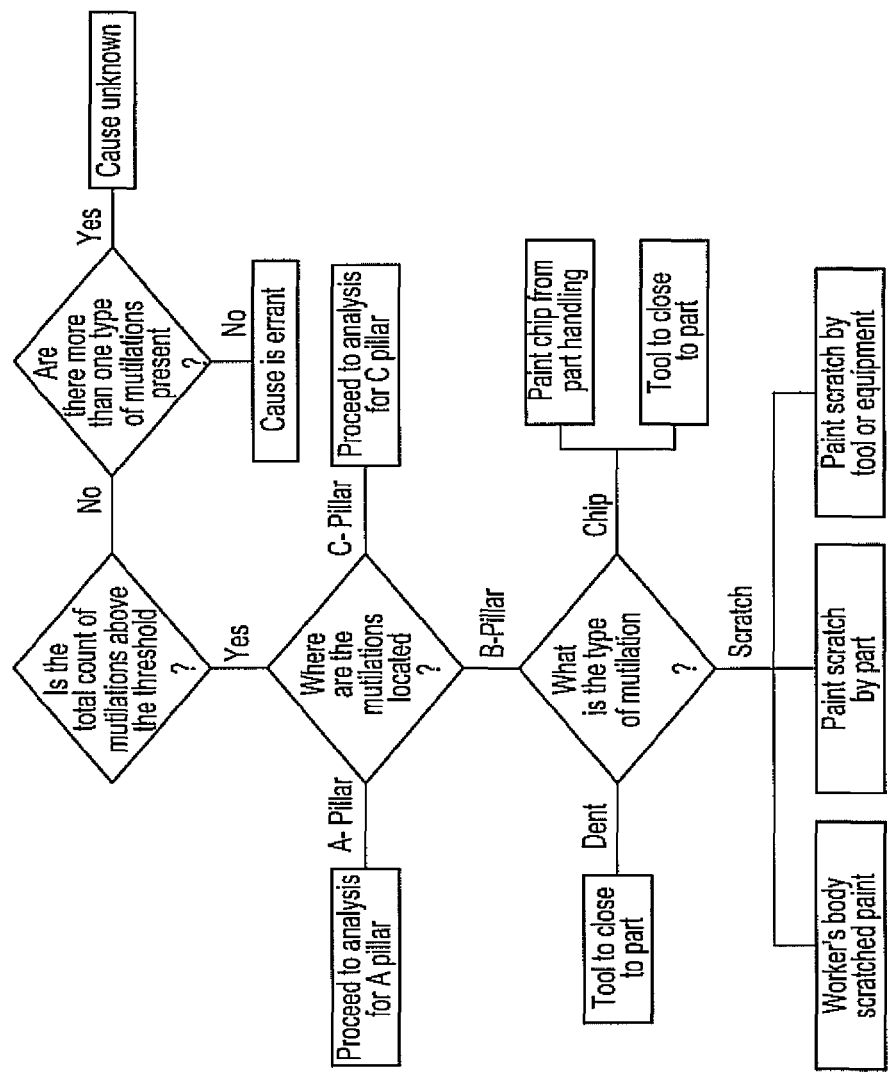
FIG. 5 is a flow chart showing an embodiment of the process of the root cause analysis circuit.

With reference now to FIG. 5, a flow chart of an embodiment of the root cause analysis circuit 38 is provided. The root cause analysis circuit 38 processes the information in the database 28 over a predetermined period. The root cause analysis circuit 38 identifies each mutilation defect and presents predetermined possibilities for the occurrence. For example, when the mutilation defect is a scratch on the B pillar above the courtesy switch and striker, the root cause analysis circuit 38 presents three possibilities in which the scratch may occur. In one possibility, the scratch is a result of the assembly worker's body. Another possibility, the scratch is a result of another part, and the third possibility is that scratch results from a tool or equipment. The root cause analysis circuit 38 may then select from a list of predetermined root causes which root cause is the source of the mutilation defect. The root cause analysis circuit 38 may further include a list of predetermined countermeasures, wherein based upon the selected possible root cause of the mutilation defect one of the predetermined countermeasures is provided.

Figure 6:
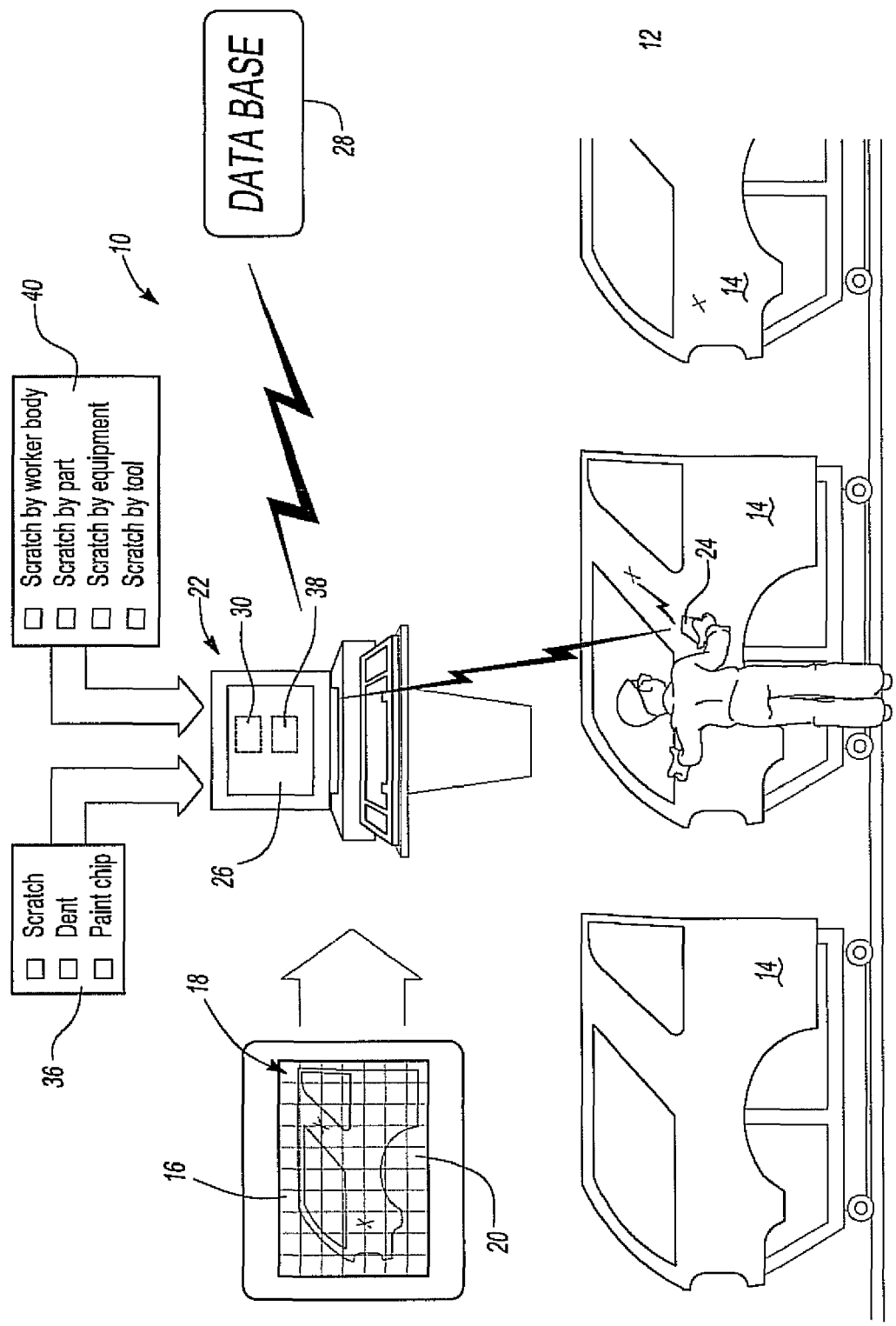
FIG. 6 is a view of the operation of a production line using the quality control system.

With reference now to FIG. 6, an illustrative operation of the system 10 is provided. The grid system 18 may be formed using software such as a spreadsheet software. Spreadsheet software are currently known and used and any of which are adaptable for use herein. The software may be used to create a grid system 18 onto the benchmark image 16. Specifically, the grid system 18 is projected onto the benchmark image 16 by formulating the boundaries of the cell 20. The grid system 18 may be scaled to fit benchmark images 16 having different pixel sizes.

Accordingly, the grid system 18 need not be plotted onto the benchmark image 16. Rather, the inspector may simply actuate the interface 24 so as to map the mutilation defect onto a clean copy of the benchmark image 16. The plotting circuit 30 then associates the location of the marked mutilation defect with a corresponding cell 20 of the grid system 18. The computer processing unit 22 may then display 26 the benchmark image 16 with the plotted history of mutilation defects over a period of time. The period may be over a given time span, or a predetermined number of vehicles 14 produced. Alternatively, the interface 24 is operable to selectively place an identified mutilation defect onto the corresponding location of the benchmark image 16 having the grid system 18 plotted thereon.

Thus, as a particular vehicle 14 is being inspected for mutilation defects, the identified defects are marked onto a benchmark image 16. The identified mutilation defects are stored in the database 28 and a report showing the history of mutilation defects for the vehicle 14 may be provided for analysis.

For instance, with reference to again to FIG. 2, the vehicle 14 benchmark image 16 is shown with the overlay of a grid system 18. The grid system 18 is ten cells 20 wide (x-axis) and seven cells 20 tall (y-axis). The benchmark image 16 represents the frequency and location of mutilation defects over a period of one thousand vehicles 14. Each of the one thousand vehicles 14 has been inspected for mutilation defects, as shown in FIG. 6. The inspector enters each identified defect in computer processing unit 22 using the interface 24, shown as a handheld device that may be uploaded into the computer processing unit 22. The computer processing unit 22 then stores the information in the first database 28. Specifically, the database 28 stores each of the mutilation defect and the plotting circuit 30 counts each occurrence of mutilation defects within each of the cells 20 of the grid system 18.

The computer processing unit 22 may also present the first list 36 having types of mutilation defects. For instance, upon identifying a mutilation defect, the computer processing unit 22 may prompt the inspector to choose from a list of mutilation defects such as "scratch," "dent", or "chip." The inspector may use the interface 24 to choose from one of the items presented in the first list 36. The computer processing unit 22 then stores the type of defect found and the cell 20 where the defect was found in the first database 28.

Figure 3:
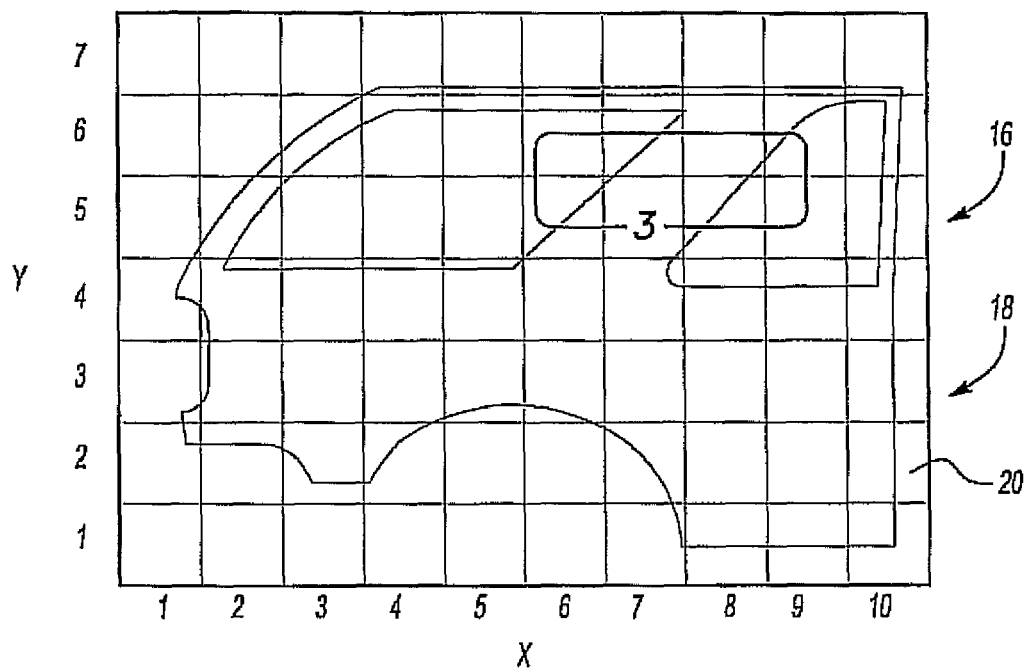
FIG. 3 is a view of the benchmark image of FIG. 2 with a grid system plotted thereon.

The plotting circuit 30 then labels 34 each of the cells 20 with the label 34 associated with the count value of each cell 20. For instance, FIG. 3 shows the cell 20 having coordinates (7, 6) has a count of at least thirty mutilation defects over a period of one thousand parts produces. Thus, the system 10 identifies that there may be a process or tool abnormality which tends to cause the mutilation defect.

The system 10 may then identify any of the cells 20 that exceed an established count of mutilation defects. The root cause analysis circuit 38 may process each of the identified cells 20 to provide a possible root cause. Alternatively, the user may simply examine the plotted benchmark image 16 to determine if a particular frequency of mutilation warrants further investigation. Thus, the system 10 improves the quality control of a part by providing an easily identifiable map showing the frequency of mutilation defects on a particular part of a mass produced product.

Figure 7:
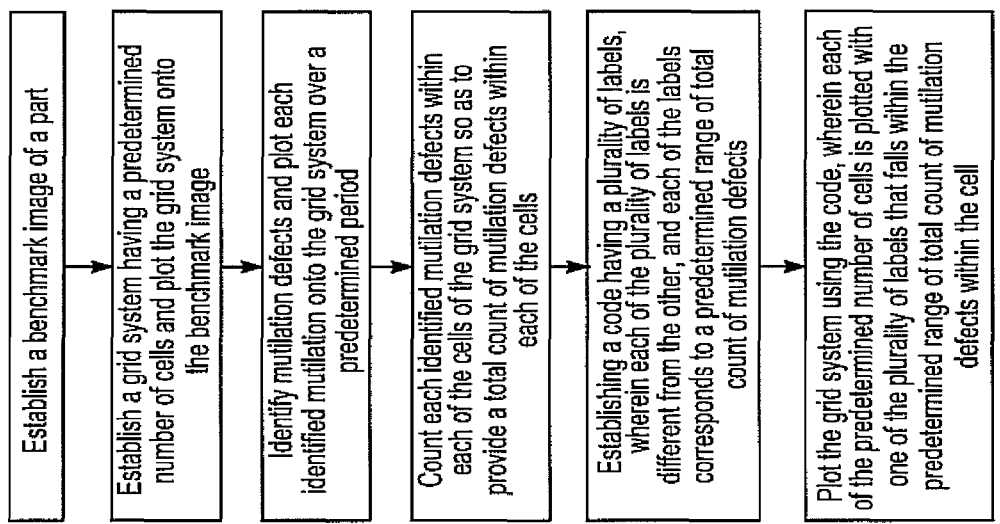
FIG. 7 is a list of the steps for a method for analyzing vehicle mutilation defects.

With reference now to FIG. 7, a method for mapping vehicle 14 mutilation defects is provided. The method is directed towards a quality control method for analyzing and detecting the root cause of a mutilation defect on a part. The method includes the steps of establishing a benchmark image 16 of a part. Establishing a grid system 18 and plotting the grid system 18 onto the benchmark image 16. Identifying mutilations and plotting each identified mutilation onto the grid system 18 over a predetermined period. Establishing a code. The code including a plurality of different labels 34, and each of the labels 34 corresponds to a predetermined count value of mutilation defects. The method further includes the step of plotting the grid system 18 with the code.

The method may further include the step of associating each of the identified mutilation defects with a type of mutilation defect and storing the type of mutilation and location of the mutilation in the first database 28. The method may include the step of providing a first list 36 having a plurality of predetermined types of mutilation defects, wherein one of the types of mutilation defects is selected and stored in the first database 28.

The method may also include the step of providing a list of possible root causes. Each of the possible root causes may based upon factors such as the type of mutilation defect identified, the frequency of the occurrence of the mutilation defects in a cell 20, the location of the mutilation defect on the part, and the like.

What is claimed is:

1. A system for analyzing mutilation defects so as to improve quality control of a production line, wherein the production line is configured to mass produce a part, the system comprising:

a benchmark image of a mass produced part;

a grid system, having a predetermined number of cells plotted onto the benchmark image;

a computer processing unit having an interface for entering mutilation defects, wherein the interface is operable to associate the location of the detected mutilation defect to the corresponding cell plotted on the benchmark image;

a database in communication with the computer processing unit, the database for storing the mutilation defects;

a plotting circuit having a code, wherein the code includes a predetermined number of labels and each of the predetermined number of labels is different from the other, and wherein the plotting circuit is operable to count each occurrence of a mutilation defect in each of the predetermined number of cells so as to give a total count of mutilation defects detected in each of the predetermined number of cells, and wherein each of the predetermined number of labels is associated with a predetermined range of the total count of mutilation defects, and wherein the plotting circuit plots the benchmark image with each of the predetermined number of labels corresponding to the total count of mutilation defects detected within the each of the predetermined number of cells onto the grid system;

a display for displaying the benchmark image of the vehicle having the code plotted thereon; and a root cause analysis circuit having a second list, the second list having a plurality of predetermined root causes, wherein each one of the plurality of predetermined causes is associated with a type of mutilation defect and the area of the vehicle body in which the mutilation defect was found, and wherein the root cause analysis circuit analyzes the label of a particular cell and the location of the labeled cell so as to provide one of the plurality of predetermined root causes from the second list for the occurrence of the mutilation defect of each of the cells.

2. The system as set forth in claim 1, wherein the each of the predetermined number of labels is a color.

3. The system as set forth in claim 1, wherein the each of the predetermined number of labels is a shade.

4. The system as set forth in claim 1 wherein the computer processing unit further includes a first list, the first list presenting a predetermined number of types of mutilation defects, wherein the interface is further operable to selectively choose from one of the predetermined number of types of mutilation, and wherein the selected type of mutilation is stored in the first database.

5. The system as set forth in claim 1, wherein one of plurality of predetermined root causes is unknown.

6. The system as set forth in claim 5, further including a threshold value, wherein the threshold value is predetermined count of mutilation defects in any given area of the vehicle over a predetermined time, and wherein the root cause analysis circuit processes the database and identifies which of the cells does not contain a count value greater than the threshold value, and wherein the root cause analysis circuit then identifies those cells having a count value less than the threshold values as being instances of mutilation defects wherein the root cause is unknown.

7. A method for analyzing mutilation defects so as to improve quality control of a production line, wherein the production line is configured to mass produce a part, the system comprising the steps of:

providing a computer processor having a first database, and a display;

storing a benchmark image of a part in the first database;

establishing a grid system and plotting the grid system onto the benchmark image, wherein the grid system includes a predetermined number of cells;

providing a scanner operable to identify mutilation defects, the scanner transmitting the mutilation defects to the computer processor, the computer processor plotting each identified mutilation defect onto the grid system over a predetermined period of time;

the computer processor further operable to count each identified mutilation defects within each of the cells of the grid system so as to provide a total count of mutilation defects within each of the cells;

establishing a code, wherein the code includes a plurality of labels, each of the plurality of labels is different from the other, and wherein and each of the labels corresponds to a predetermined range of total count of mutilation defects; and plotting the grid system using the code, wherein each of the predetermined number of cells is plotted with one of the plurality of labels that falls within the predetermined range of total count of mutilation defects within the cell, the computer processor operable to display the plotted grid system on the display;

providing a first list having a plurality of predetermined types of mutilation defects, wherein each of the identified mutilation defects is associated with one of the plurality of predetermined types of mutilation defects; and providing a second list, the second list presenting a plurality of possible root causes, wherein each of the plurality of possible root causes is based upon the type of mutilation defect identified, the frequency of the occurrence of the mutilation defects in the cell, and the location of the mutilation defect on the part, wherein the computer processor processes the plotted grid system, the first list, and the second list so as to provide a list of possible root causes of the identified mutilation defects.

* * * * *

UNITED STATES PATENT AND TRADEMARK OFFICE
CERTIFICATE OF CORRECTION

PATENT NO.         : 8,140,284 B2                                      Page 1 of 1
APPLICATION NO.    : 12/409121
DATED              : March 20, 2012
INVENTOR(S)        : Adam Roy Cookson It is certified that error appears in the above-identified patent and that said Letters Patent is hereby corrected as shown below:

Column 6, line 7, Delete "produces" insert --produced--.

Column 6, line 42, after may insert --be--.

Column 7, line 35, after of insert --a--.

Signed and Sealed this
Thirty-first Day of July, 2012

David J. Kappos
*Director of the United States Patent and Trademark Office*